US008503434B2

(12) United States Patent
Kant et al.

(10) Patent No.: US 8,503,434 B2
(45) Date of Patent: Aug. 6, 2013

(54) METHOD AND SYSTEM FOR INSERTING A NEW NODE INTO A COMMUNICATIONS PATH BETWEEN TWO EXISTING NODES WITHOUT DISRUPTION

(75) Inventors: Nishi Kant, San Jose, CA (US); Heeseon Lim, Cupertino, CA (US)

(73) Assignee: Stoke, Inc., Tokyo (JP)

(*) Notice: Subject to any disclaimer, the term of this patent is extended or adjusted under 35 U.S.C. 154(b) by 982 days.

(21) Appl. No.: 12/568,613

(22) Filed: Sep. 28, 2009

(65) Prior Publication Data
US 2011/0075659 A1  Mar. 31, 2011

(51) Int. Cl.
*H04L 12/66* (2006.01)
(52) U.S. Cl.
USPC ........... 370/352; 370/218; 370/230; 370/355; 370/356; 370/360; 370/357; 370/379; 370/389; 709/220; 709/223; 709/228
(58) Field of Classification Search
USPC .............. 370/218, 230, 230.1, 352, 355, 356, 370/357, 360, 379, 389; 709/220, 223, 228
See application file for complete search history.

(56) References Cited

U.S. PATENT DOCUMENTS

| 7,908,378 B2* | 3/2011 | Trossen et al. ............... 709/227 |
| 7,970,402 B2* | 6/2011 | Wu et al. ..................... 455/436 |
| 2001/0053145 A1* | 12/2001 | Willars et al. ............... 370/352 |
| 2005/0197155 A1* | 9/2005 | Baker et al. ................ 455/552.1 |
| 2006/0159121 A1* | 7/2006 | Sakata et al. ................. 370/466 |
| 2008/0002669 A1* | 1/2008 | O'Brien et al. ............... 370/352 |
| 2011/0075557 A1* | 3/2011 | Chowdhury et al. ......... 370/230 |

* cited by examiner

*Primary Examiner* — Asad Nawaz
*Assistant Examiner* — Khaled Kassim
(74) *Attorney, Agent, or Firm* — Blakely, Sokoloff, Taylor & Zafman LLP

(57) ABSTRACT

Techniques for inserting a new node into a communications path of existing nodes of a 3GPP network are described herein. According to one embodiment, state information is captured within a transport protocol layer of a first node. The state information pertains to an existing communications session between a second node and a third node, while the first node routing packets exchanged between the second and third nodes via the existing communications session. The transport protocol layer of the first node is then configured using the captured state information to enable the transport protocol layer of the first node to independently communicate with a transport protocol layer of the second node and the third node respectively without terminating the existing communications session.

17 Claims, 9 Drawing Sheets

METHOD AND SYSTEM FOR INSERTING A NEW NODE INTO A COMMUNICATIONS PATH BETWEEN TWO EXISTING NODES WITHOUT DISRUPTION

FIELD OF THE INVENTION

The present invention relates generally to third generation partnership project (3GPP) networks (e.g., general packet radio service or GPRS and its evolution to universal mobile telecommunications system or UMTS and beyond). More particularly, this invention relates to a method for inserting a new node into a communications path between existing nodes in a 3GPP network.

BACKGROUND

The GPRS/UMTS is an evolution of the global system for mobile communications (GSM) standard to provide packet switched data services to GSM mobile stations. Packet-switched data services are used for transmitting chunks of data or for data transfers of an intermittent or bursty nature. Typical applications for 3GPP packet service include Internet browsing, wireless e-mail, and credit card processing, etc.

FIG. 1A is a block diagram illustrating typical 3GPP packet architecture. Referring to FIG. 1A, user equipment (UE) 101 is communicatively coupled to a radio network controller (RNC) 102 of a radio access network (RAN) 103. In order to access other networks such as Internet 107 and/or operator services node 108, UE 101 has to go through 3GPP packet core network 106. Typically, 3GPP packet core network 106 includes a serving GPRS support node (SGSN) 104 and a gateway GPRS support node (GGSN) 105. These support node SGSN and gateway node GGSN relay communications between a user terminal (e.g., source mobile station) and a destination.

Note that typically, there may be multiple SGSNs associated with a GGSN, multiple RNCs associated with a SGSN, and multiple UEs associated with an RNC in a hierarchical structure (not shown). Thus, when traffic from the UEs increases, the traffic imposed on higher level nodes (e.g., SGSN and/or GGSN) in the hierarchical structure will be exponentially increased.

As the adoption of mobile broadband increases, the need for higher capacity backhaul and higher capacity in processing nodes goes up. Evolved high speed packet access (HSPA+) provides a bandwidth in tens of mbps per user and adding femto services to the 3G offering will encourage users to consume and generate more mobile broadband traffic. That in turn may choke the core network nodes which were not designed for the onslaught of the mobile broadband. There have been some discussions in the industry to offload the 3GPP packet core networks from heavy Internet bound broadband traffic, for example, by introducing a mobile data offload gateway (MDO-GW) device, which reroutes Internet bound traffic directly to Internet, bypassing the core network such as SGSN.

While there are many ways to offload the core network, most of them involve re-configuration or restarting of existing nodes (e.g., RNC, SGSN) in the network, which increases the operational cost for the mobile operators as well as disrupts services from the user perspective. For example, if an MDO-GW device is introduce between RNC 102 and SGSN 104, the RNC 102 and SGSN 104 have to be reconfigured and an existing communications session has to be terminated.

As more operators and transport network providers are moving to Internet protocol (IP) networking for all their infrastructure needs, the interface (e.g., Iu-ps) between RNC 102 and SGSN 104 has either been or is in process of being upgraded to signaling transport (SIGTRAN) based transport layers. Even in a legacy asynchronous transmission mode (ATM) based network, SIGTRAN can selectively be introduced by using ATM or IP converters.

FIG. 1B is a block diagram illustrating a SIGTRAN-based protocol stack for a packet domain. As shown in FIG. 1B, the stream control transmission protocol (SCTP) layer establishes a connection between RNC 102 and SGSN 104 to provide reliable communication between the two. The IP address and the port identify a peer entity. The media transfer protocol (MTP) level 3 (MTP3) user adaptation (M3UA) layer is a counterpart of signaling system #7 (SS7) MTP3 for SIGTRAN and provides a connectionless association between RNC 102 and SGSN 104. The signal connection control point (SCCP) layer provides a connection per session to carry RAN application part (RANAP) messages. There could be as many SCCP connections as the number of sessions between RNC 102 and SGSN 104.

In order to insert a new node such as an MDO-GW between RNC 102 and SGSN 104, each of these protocol layers has to be reconfigured and an existing connection between the corresponding protocol layers of RNC 102 and SGSN 104 have to be terminated and restarted. This may cause unnecessary disruptions to the operations of RNC 102 and SGSN 104.

SUMMARY OF THE DESCRIPTION

Techniques for inserting a new node into a communications path of existing nodes of a 3GPP network are described herein. According to one aspect of the invention, state information is captured within a transport protocol layer of a first node. The state information pertains to an existing communications session between a second node and a third node, while the first node routing packets exchanged between the second and third nodes via the existing communications session. The transport protocol layer of the first node is then configured using the captured state information to enable the transport protocol layer of the first node to independently communicate with a transport protocol layer of the second node and the third node respectively without terminating the existing communications session.

According to another aspect of the invention, state information is captured within a current transport protocol layer of a transport protocol stack of a first node from a packet exchanged via an existing connection session between a second node and a third node. The state information pertains to a transport protocol associated with the current transport protocol layer of the existing connection session. The current transport protocol layer is then configured using the captured state information to enable the current transport protocol layer of the first node to independently communicate with a corresponding transport protocol layer of the second node and the third node respectively without terminating the existing connection session. When the current transport protocol layer has been configured, the packet is passed to an upper transport protocol layer of the transport protocol stack to allow the upper transport protocol layer to capture state information pertaining to a transport protocol associated with the upper transport protocol layer.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
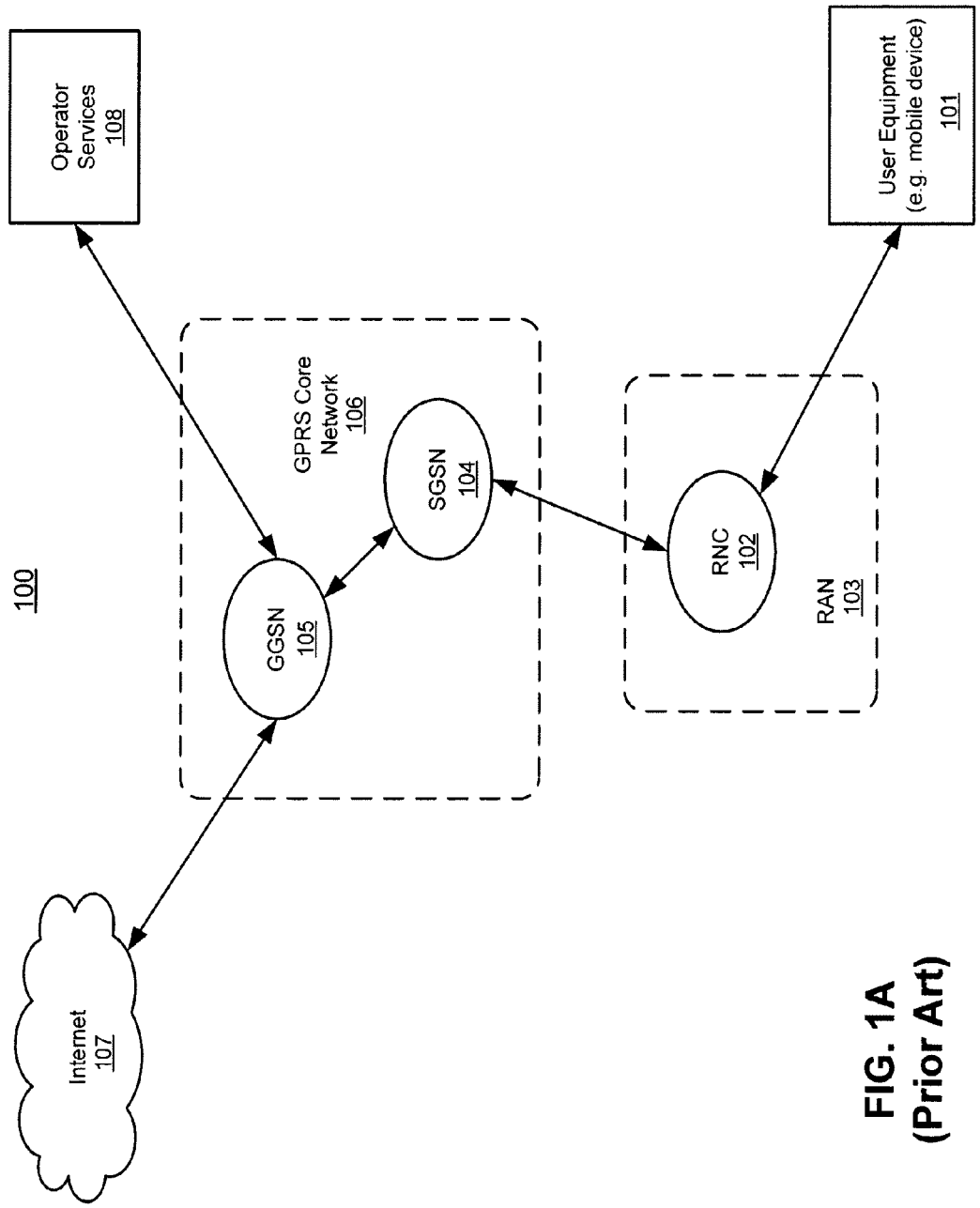
FIG. 1A is a block diagram illustrating typical 3GPP packet architecture.
Figure 1B:
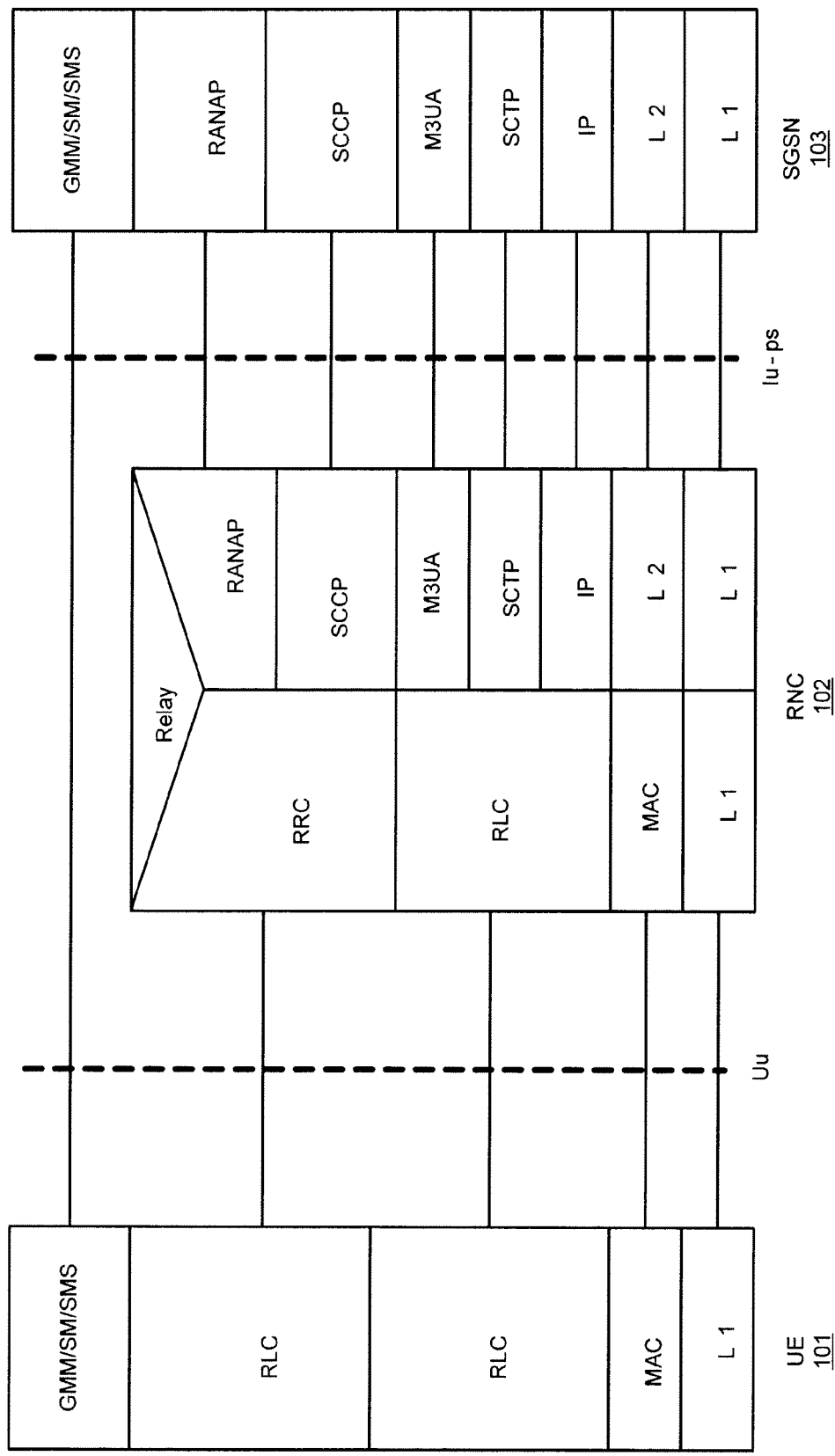
FIG. 1B is a block diagram illustrating a protocol stack of 3GPP packet architecture.

Techniques for inserting a new node into a communications path of existing nodes of a 3GPP network are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, a new entity, such as MDO-GW, may be introduced between an RNC and an SGSN to offload the 3GPP packet code network from broadband Internet-bound traffic. This can be made possible by modifying several relevant parameters in session management (SM) and RANAP messages. However, the necessity to introduce such a new entity between the RNC and SGSN requires a new IP address and point codes, which requires reconfiguration of all the RNCs and SGSNs with respect to the new entity's information as well as service disruption since all the connections need to be reestablished.

According to certain embodiments, such a disruption can be avoided by introducing a system learning entity (SLE) within or between the transport protocol stacks. The new node includes two separate protocol stack for maintaining two independent connections, one with RNC and the other with SGSN, while the SLE module provides a learning mechanism to acquire the necessary information to build up the connection states of the ongoing connections. The new node is initialized as a passive routing device for routing packets between the RNC and SGSN, while the SLE is learning the necessary information from the packets to build up the protocol stacks. Once the protocol stacks have been successfully configured and activated, the new node can independently communicate with the RNC and SGSN by splitting the existing connection session into two separate sessions using the information captured during learning to maintain the connection states of the sessions with respect to the original session. From the view points of RNC and SGSN, they continue operating as usual as if they were still communicating with the original party via the original session. As a result, the operations of RNC and SGSN are not disrupted.

Note that throughout this application, an MDO-GW device is used as an example of a new node inserted into a communications path of an RNC and SGSN of a 3GPP network for the purpose of illustration. However, it is not so limited; the techniques described herein can also be applied to any situation in which a new node is inserted into an existing path of two existing node without disrupting the association and operations of the existing nodes.

Figure 2A:
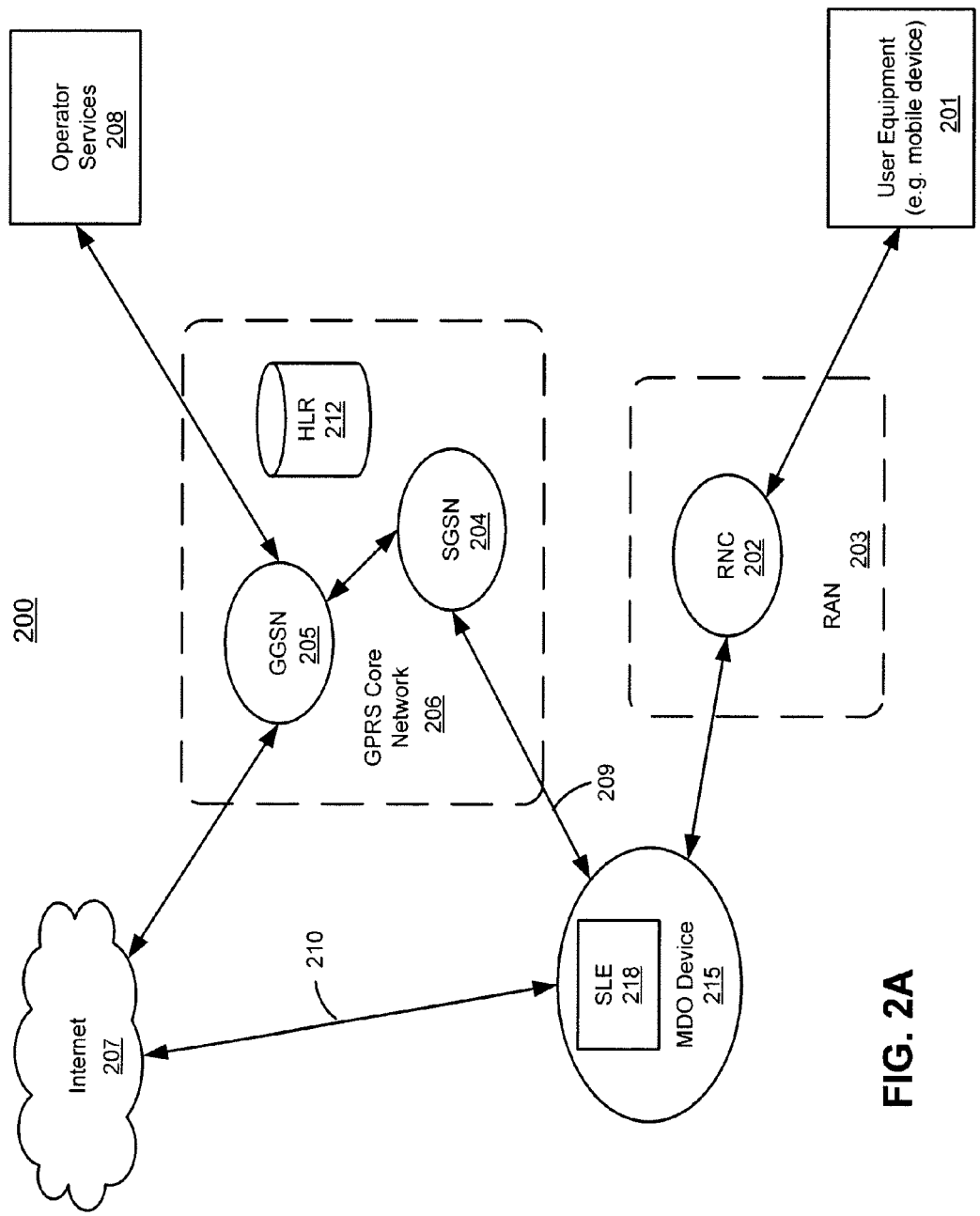
FIG. 2A is a block diagram illustrating a 3GPP packet system according to one embodiment.

FIG. 2A is a block diagram illustrating a 3GPP packet system according to one embodiment. Referring to FIG. 2A, similar to FIG. 1A, system 200 includes UE 201 communicatively coupled to RNC 202 of RAN 203. Usually, in order to access other networks such as Internet 207 and/or operator services node 208, UE 201 has to go through 3GPP packet core network 206. Typically, 3GPP packet core network 206 includes SGSN 204, GGSN 205, and a home location register (HLR) 212. These support node SGSN 204 and gateway node GGSN 205 have a function of relaying communication between a user terminal (e.g., source mobile station) and a destination node (e.g. a server in the Internet or another mobile station). Note that again, there may be multiple SGSNs associated with a GGSN, multiple RNCs associated with a SGSN, and multiple UEs associated with an RNC in a hierarchical structure (not shown).

SGSN 204 handles data transmission between UE 201 and GGSN 205. For example, SGSN 204 collects up-link sessions from the RNC 202 and distributes the down-link session delivered from a gateway node GGSN 205 toward RNC 202. The SGSN 204 manages a packet service between SGSN 204 and GGSN 205 by tunneling (e.g., GTP-GPRS tunneling protocol). SGSN 204 receives the subscriber profile stored in HLR 212 and has therein at any time a copy thereof. The subscriber profile has information about the subscribed services (e.g., Internet, operator walled garden etc.)

GGSN 205 functions as a logical interface to an external data packet network such as Internet 107 operator services node 208 and operates for coupling between core network 206 and such external packet data networks 107, 208. More specifically, GGSN 205 collects up-link sessions from SGSN 204 and accesses Internet 107 or operator services 208. GGSN 205 in the 3GPP packet core network 206 sets up a tunnel down to SGSN 204 for down-link sessions.

HLR 212 is a database node for storing subscriber profile including registered location information of the mobile stations, and delivers a copy of the subscriber data to the support node SGSN 204, upon request therefrom. More specifically, HLR 209 stores permanent subscriber data as to each of the mobile subscribers, such as including a mobile station ISDN number (MSISDN) which specifies a proprietary mobile subscription by using a public switched telephone network (PSTN) numbering plan, and an international mobile subscriber identity (IMSI) which is a proprietary identity or ID allocated to each subscriber and used for identification during the signal transmission in the mobile network system. HLR 209 also stores therein data including the current subscriber location corresponding to the address of VLR (visitor location register). For every mobile subscriber, it stores a list of the services that are allowed to the mobile subscriber.

In addition, according to one embodiment, an MDO-GW 215 is communicatively coupled SGSN 204 of GPRS core network 206 and RNC 202 of RAN 203. For the purpose of illustration, in this example, MDO-GW 215 is implemented between SGSN 204 and RNC 203. However, MDO-GW 215 may also be located in other locations. In one embodiment, MDO-GW 215 is configured to interpret the control traffic flowing between UE/RNC and SGSN. Particularly, MDO-GW 215 is configured to examine the control traffic to determine whether UE 201 is attempting to establish a communication path with the Internet 207 or operator services 208.

If the traffic is for operator's services 208, both the control traffic and the associated data traffic are allowed to reach, via path 209, SGSN 204 for transfer to GGSN 205 in order to reach operator's services 208. If it is determined that the traffic is destined for Internet 207, MDO GW 215 directs the data traffic to Internet 207 via path 210, bypassing SGSN 204 and/or GGSN 205 of 3GPP packet core network 206, while the control traffic may still be routed to SGSN 204. Thus, only the Internet bound data traffic (also referred to as user traffic) will be diverted directly to the Internet 207, while the rest of the traffic will be allowed to enter 3GPP packet core network 206. Further detailed information concerning system 200 can be found in a co-pending U.S. patent application Ser. No. 12/415,853, entitled "Method and System for Bypassing 3GPP Packet Switched Core Network When Accessing Internet from 3GPP UEs using 3GPP Radio Access Network", filed Mar. 31, 2009, which is incorporated by reference herein in its entirety.

According to one embodiment, MDO GW device 215 includes a system learning entity (SLE) 218 to learn or capture certain information such as connection state information of an existing connection session between RNC 202 and SGSN 204 without disrupting the existing connection session. When MDO GW device 215 is introduced to a communications path or an existing communications session between RNC 202 and SGSN 204, device 215 acts as a passive router to route packets exchanged between RNC 202 and SGSN 204. Meanwhile, SLE 218 is configured to learn or capture certain information or parameters of the packets. The captured information is used to build or configure a protocol stack therein (not shown). Once the protocol stack has been configured, device 215 can independently communicate with RNC 202 and SGSN 204 without having to terminate the existing connection session. As result, device 215 is non-intrusively inserted into a communications path between RNC 202 and SGSN 204 without having to reconfigure RNC 202 and SGSN 204.

Figure 2B:
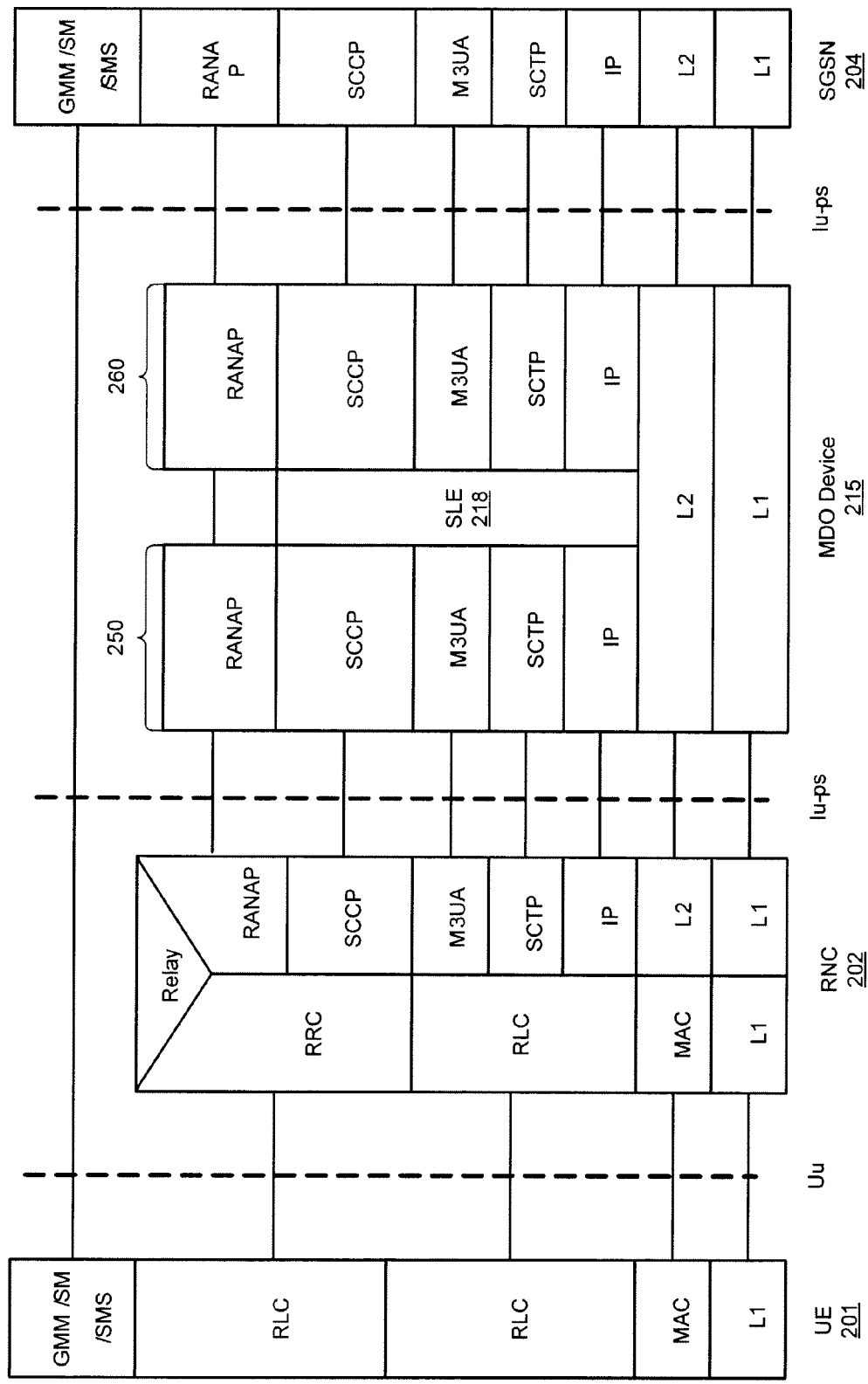
FIG. 2B is a block diagram illustrating a protocol stack of 3GPP packet architecture according to one embodiment.

FIG. 2B is a block diagram illustrating a protocol stack according to one embodiment. For example, the protocol stack configuration may be used in network configuration 200 of FIG. 2A. Referring to FIG. 2B, in this example, MDO GW device 215 maintains two separate transport protocol stacks 250 and 260, logically or physically. The protocols tacks 250 and 260 are used to maintain two independent connections or communications sessions, one with RNC 202 and the other one with SGSN 204. In this example, transport protocol stacks 250 and 260 are SIGTRAN-based transport protocol stacks. Each of the protocol stacks 250 and 260 includes at least some of an IP layer, SCTP layer, M3UA layer, and SCCP layer for communicating with a counterpart layer of RNC 202 and SGSN 204 respectively.

Initially, the MDO GW device 215 operates as a passive router by only relaying messages or packets between RNC 202 and SGSN 204. While packets exchanged between RNC 202 and SGSN 204 are routed through the protocol stacks 250 and 260, SLE 218 is configured to learn or capture certain information from the packets traversing through the protocol stacks 250 and 260. SLE 218 provides a mechanism to acquire the necessary information to build up the connection states of the ongoing connections. Protocol stacks 250 and 260 may be implemented as part of control plane protocol stack within MDO GW device 215. The captured information may be used to configure and/or activate some specific transport layers of the protocol stacks 250 and 260. Once protocol stacks have been configured and activated, the RANAP messages and SM messages can be snooped.

The captured information may include state information, where the state information is the information that is required to build the state on the transport layers such as SCTP, M3UA, and SCCP layers. In one embodiment, for SCTP, the state information includes source and/or destination ports, verification tag, sequence numbers, stream identifier, stream sequence number, and SACK information, etc. For M3UA, the state information includes originating and/or destination point codes, network indicator, signaling link selection (SLS), and correlation identifier, etc. For SCCP, the state information includes source and/or destination local references, etc. Other information may also be captured.

According to another embodiment, certain configuration information may also be captured, such as, for example, the information needed to identify and build sessions on the IP layer. This includes the IP addresses of RNC 202 and SGSN 204 for each session. Since RNC 202 and SGSN 204 would not be configured with a new peer IP address, RNC 202 and SGSN 204 may only expect the packets coming from the configured source IP, SGSN 204 or RNC 202, respectively.

To keep this configuration seamless from the network point of view, SLE 218 provides a mechanism to map the original source/destination IP address to the session. Similarly, the point codes in use could also be learnt. Using this information, the outgoing side stack 260 can reconstruct the packets as if they are coming directly from RNC 202. Once SLE 218 obtains all the information it needs regarding configuration and session states, both protocol stacks 250 and 260 of MDO GW device 215 can build a state machine based on the existing session states. Thereafter, each protocol stack can maintain its own state machine and SLE 218 couples both protocol stacks to each other. With SLE 218, it is possible to provide offload services without reconfiguring the existing core network nodes or disrupting the ongoing sessions. It effectively provides seamless and non-intrusive introduction of MDO GW device 215 for traffic offload.

Figure 3:
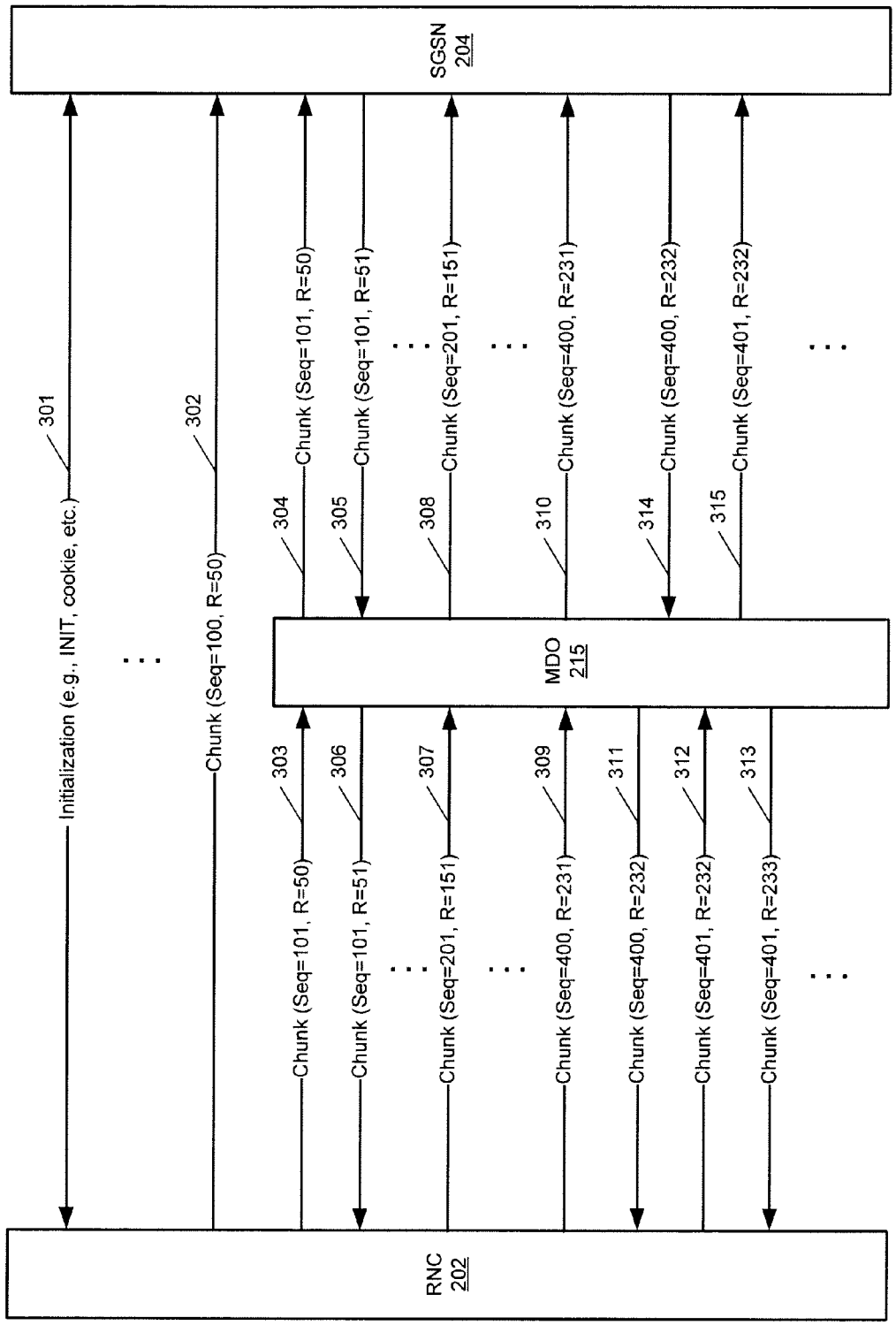
FIG. 3 is a transactional diagram illustrating a processing flow between multiple nodes according to one embodiment of the invention.

FIG. 3 is a transactional diagram illustrating a processing flow between multiple nodes according to one embodiment of the invention. Referring to FIG. 3, initially, RNC 202 has an existing communications session with SGSN 204 via transactions 301-302. It is assumed that after transaction 302, MDO GW device 215 is introduced between RNC 202 and SGSN 204, where device 215 acts as a passive router while learning certain information from the traffic. Here, through transactions 303-306, the SLE of device 215 is learning certain connection state and configuration information from the traffic involving these transactions, while routing the traffic between RNC 202 and SGSN 204. During this period, the protocol stack of MDO GW device 215 is in a "learning" operating state.

It is assumed that by at transactions 307-308, the SLE of MDO GW device 215 has obtained all the necessary information to build and configure its transport protocol stack. However, the transport protocol stack has not been activated yet at this point. In this period, the protocol stack is in a "learn complete" operating state. During this period, the traffic between RNC 202 and SGSN 204 is still passively routed by device 215. For example, although device 215 is ready to take over the traffic handling, device 215 may be in a standby mode for backup purposes.

It is assumed that by transactions 309-310, the MDO GW device 215 is activated, which puts the protocol stack of ISO GW device 215 in an "Up" operating state. Thereafter, the protocol stack or stacks can independently communicate with RNC 202 (e.g., via transactions 311-313) and SGSN 204 (e.g., via transactions 314-315), without terminating the existing session. For example, at this point, the MDO GW device 215 may transition from a standby mode to an active mode. At this point, in response a message received from RNC 202, MDO GW device 215 can respond to the message, relay the message to SGSN, or a combination of both. RNC 202 would not know that now it is communicating with MDO GW device 215 instead of SGSN 204, since the existing session is still active from the view point of RNC 202. Similar situation is applied to communications between MDO GW 215 and SGSN 204.

Figure 4:
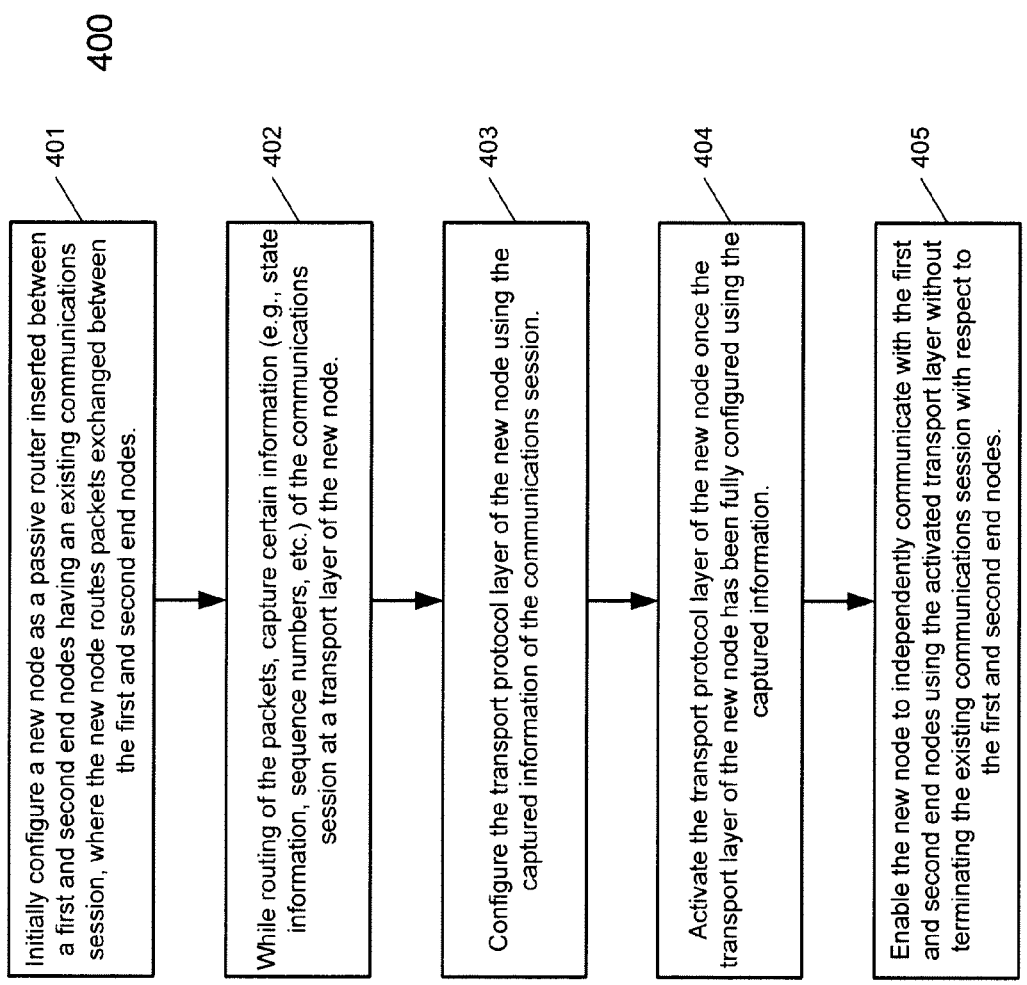
FIG. 4 is a flow diagram illustrating a method for inserting a node into an existing session of two other nodes according to one embodiment.

FIG. 4 is a flow diagram illustrating a method for inserting a node into an existing session of two other nodes according to one embodiment. Note that method 400 may be performed by processing logic which may include software, hardware, or a combination of both. For example, method 400 may be performed by SLE 218 of FIG. 2A. Referring to FIG. 4, at block 401, a new node (e.g., MDO GW device) is initially configured as a passive router inserted between a first node and a second node (e.g., an existing communications session between RNC and SGSN nodes). The new node is configured to route packets exchanged between the first and second nodes without modification. At block 402, while routing the packets, the new node captures certain information (e.g., connection state information, sequence number, etc.) of the communications session at a transport layer of the new node. At block 403, a transport layer of the new node is configured using the captured information. Once the transport layer of the new node has been configured, at block 404, the transport layer of the new node is activated. At block 405, the new node can communicate with first node and the second node independently using the activated transport layer without terminating the existing communications session with respect to the first and second nodes.

According to one embodiment, a transport layer of a new node such as an MDO GW device may include multiple transport layers, also referred to as a transport protocol stack. SIGTRAN is an example of a transport protocol stack having multiple transport layers. According to one embodiment, during a learning process, within the transport stack, each upper transport layer operates as an application layer to a lower transport layer. While routing packets between two existing nodes, a packet is not passed up to an upper transport layer for learning until a lower transport layer has captured or learned all necessary information and the lower transport layer has been configured using the captured information.

Figure 5:
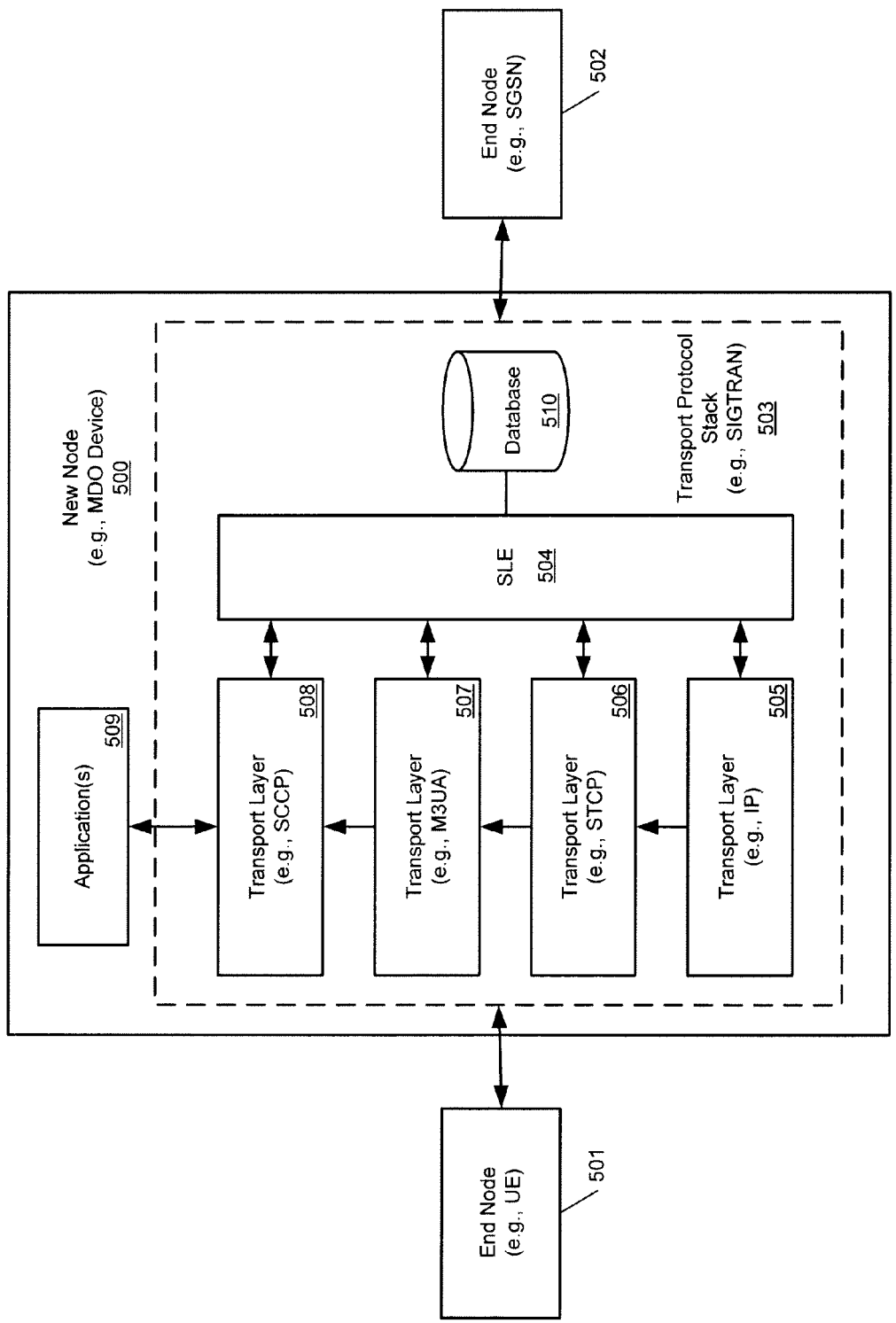
FIG. 5 is a block diagram illustrating a transport protocol stack according to one embodiment of the invention.

FIG. 5 is a block diagram illustrating a transport protocol stack according to one embodiment of the invention. For example, node 500 may be implemented as part of MDO GW device 215 of FIG. 2B. Referring to FIG. 5, new node 500 is inserted into an existing communications session between end nodes 501-502 (e.g., RNC or SGSN). Node 500 includes a transport protocol stack 503 which may be a SIGTRAN compatible transport protocol stack. The transport protocol stack 503 includes multiple transport layers 505-508. In addition, the transport protocol stack 503 includes SLE 504 for learning certain information for each of the transport layers 505-508 and the captured information may be stored in database 510, which may be stored in a non-volatile memory (e.g., disk) or a volatile memory (e.g., random access memory or RAM).

According to one embodiment, an upper transport layer operates as an application with respect to a lower transport layer. For example, transport layer 506 is treated as an application layer with respect to transport layer 505, while transport layer 507 is treated as an application layer with respect to transport layer 506, and so on. However, the transport stack as a whole operates as a transport layer to one or more applications 509.

According to one embodiment, the learning process is performed on a bottom-up approach, layer by layer. Each transport layer invokes SLE 504 to capture information from a packet routed between nodes 501-502. However, a packet is not sent to an upper transport layer until the current transport layer has captured all necessary information and is configured using the captured information (e.g., a current transport layer has transitioned from a "learning" state to a "learn complete" state). When all transport layers 505-508 have been fully configured and activated (e.g., "up" states), application 509 then may receive the packet and may process (e.g., consume) the packet, such as responding to node 501 and/or node 502 based on the packet via the existing communications session.

Note that the SLE 504 is described and shown for the illustration purpose only. SLE 504 may include multiple learning logics, each corresponding to one of the transport layers 505-508. Alternatively, the functionality of SLE 504 may be incorporated within each of the transport layers 505-508. Also note that some or all components as shown in FIG. 5 may be implemented in software, hardware, or a combination of both. Other components may also be included.

Figure 6:
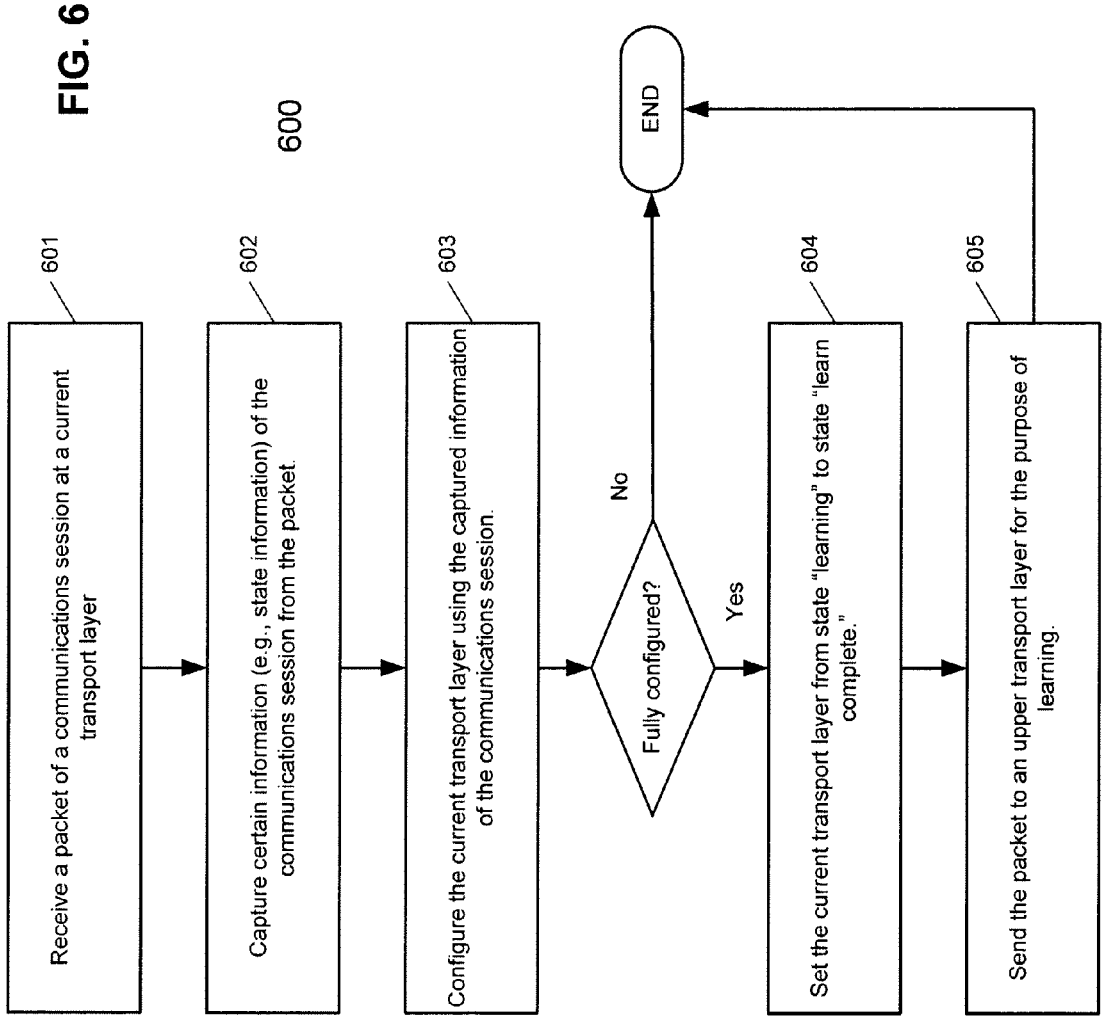
FIG. 6 is a flow diagram illustrating a learning process of a transport protocol stack according to one embodiment of the invention.

FIG. 6 is a flow diagram illustrating a learning process of a transport protocol stack according to one embodiment of the invention. For example, process 600 may be performed by SLE 504 of FIG. 5. Referring to FIG. 6, at block 601, a packet of a communications session is received at a current transport layer. At block 602, certain information is captured from the packet. At block 603, the current transport layer is configured using the captured information. If the current transport layer has not been configured, the current transport layer will continue learning from subsequent packets. If the current transport layer has been configured, at block 604, the current transport layer transitions from a "learning" state to a "learn complete" state. At block 605, the packet is sent to an upper transport layer for the purpose of learning. Other operations may also be performed.

Figure 7:
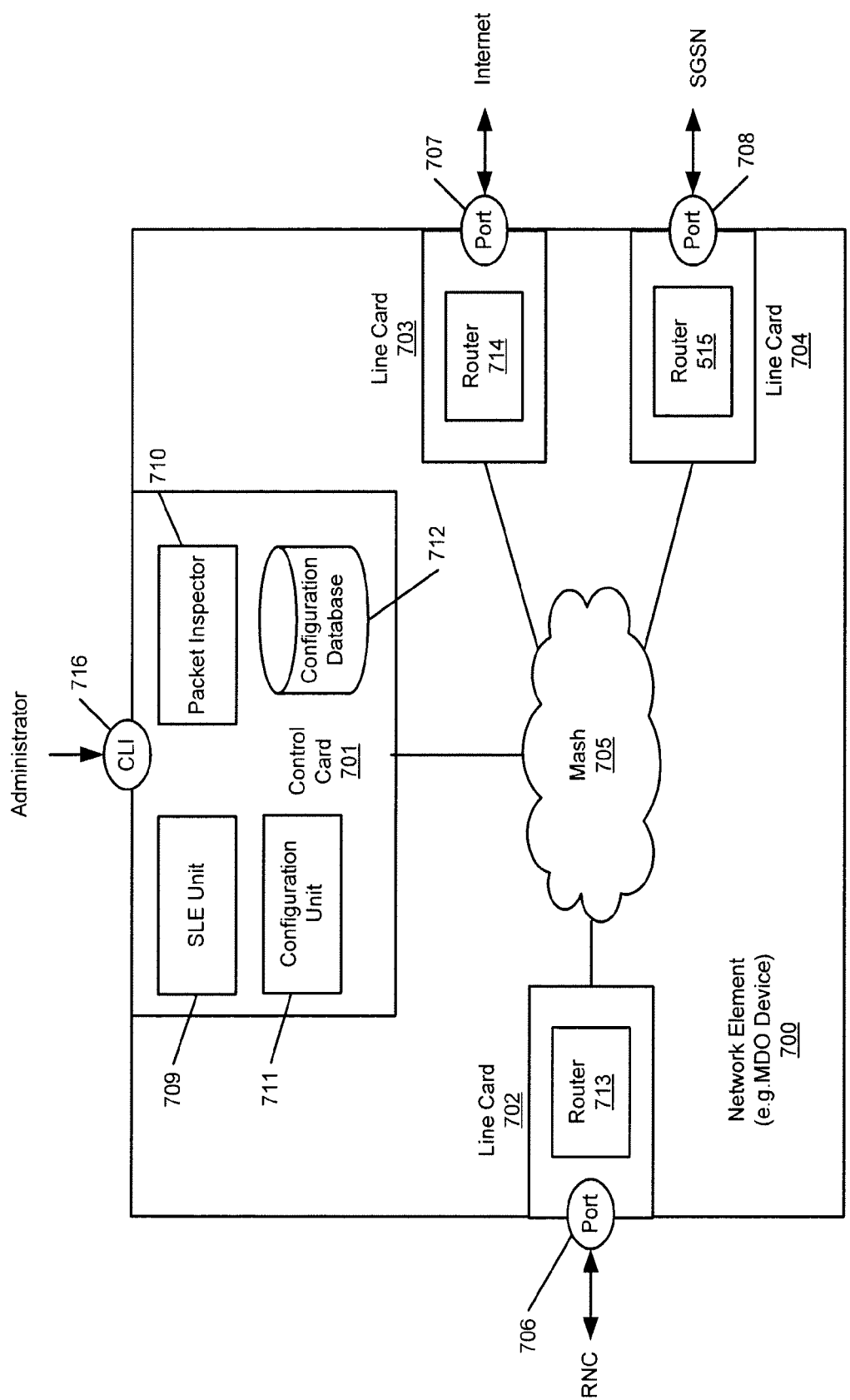
FIG. 7 is a block diagram illustrating an MDO-GW according to one embodiment of the invention.

FIG. 7 is a block diagram illustrating a network node according to one embodiment of the invention. For example, node 700 may be implemented as part of an MDO-GW device such as MDO-GW 215 of FIG. 2. Referring to FIG. 7, node 700 includes, but is not limited to, a control card 701 (also referred to as a control plane) communicatively coupled to one or more line cards 702-704 (also referred to as interface cards or user planes) over a mesh 705, which may be a mesh network, an interconnect, a bus, or a combination thereof. Each of the line cards 703-704 is associated with one or more interfaces (also referred to as ports), such as interfaces 706-708 respectively. Each line card includes routing functional block (e.g., blocks 713-715) to route packets via the corresponding interface according to a configuration (e.g., routing table) configured by control card 701. For the purpose of illustration, it is assumed that interface 706 is to be coupled to an RNC of a RAN; interface 707 is to be coupled to the Internet; and interface 708 is to be coupled to SGSN of a 3GPP packet core network for operator services.

According to one embodiment, control card 701 includes an SLE unit 709, a packet inspector 710, a configuration unit 711, and a configuration database 712. In one embodiment, packet inspector 710 is configured to intercept and inspect packets of a communications session between two end nodes such as RNC and SGSN. SLE 709 unit coupled to the packet inspector 710 is configured to capture or learn certain information of the communications session and store the captured information in database 712. The captured information is then used to configure by the configuration unit 711 a transport protocol layer or a stack of one or more transport layers using certain techniques described above. Once the transport protocol layer and/or stack of one or more transport protocol layers have been configured, the transport protocol layer and/or stack of one or more transport protocol layers can be activated, for example, by an administrator via a user interface (e.g. command line interface or CLI 716) to enable node 700 to independently communicate each of the end nodes without terminating the existing communications session as described above. Note that some or all of the components as shown in FIG. 7 may be implemented in hardware, software, or a combination of both.

Note that although an MDO GW device is used as an example of a new node to be inserted between two end nodes such as RNC and SGSN, the techniques described through this application may also be applied to any circumstance in which a new node is to be inserted into an existing communications session of two other nodes. For example, a redundant or backup SGSN may be coupled to an active SGSN to learn all necessary information in a communications session between an RNC and the active SGSN, while the backup SGSN is operating in a standby mode. Once the transport protocol layer or stack of the backup SGSN has been fully configured, the backup SGSN transitions from a "learning" state to a "learn complete" state. Thereafter, the backup SGSN can take over the job from the active SGSN, for example, when the active SGSN fails. In this situation, since the entire transport protocol layer or stack is ready, all it needs is to replicate the application or applications running in the active SGSN to the backup SGSN. The client (e.g., RNC) would not be aware of the switching.

Alternatively, the techniques described throughout this application may also be applied to a lawful interception situation, where traffic between two nodes is intercepted by a third node using the techniques described above, for example, routing to another server for analysis purposes. Other areas may also be applied.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing" or "configuring" or "passing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for introducing and configuring a network node of a packet network, the method comprising:

routing by a first node packets exchanged between a second node and a third node via an existing communications session, wherein the second node is a radio network controller (RNC), wherein the third node is a serving GPRS support node (SGSN) of a 3GPP network, and wherein the second node and the third node communicate with each other via the existing communications session prior to inserting the first node into the existing communications session between the second node and the third node, wherein the first node is a mobile data offload gateway (MDO GW) device located between the RNC and the SGSN, wherein the MDO GW device is configured to offload Internet traffic exchanged between the RNC and the Internet without going through the SGSN;

capturing by the first node addressing and state information of the existing communications session, while the first node routes the packets between the second node and the third node without modification of the packets; and configuring a transport protocol layer of the first node using addressing and state information pertaining to the existing communications session captured from the packets to enable the transport protocol layer of the first node to independently communicate with a transport protocol layer of the second node and the third node respectively without terminating or perturbing the existing communications session, such that the second node communicates with the first node as if it still communicates with the third node, and the third node communicates with the first node as if it still communicates with the second node.

2. The method of claim 1, further comprising configuring the first node initially as a passive router to route the packets between the second and third nodes via the existing communications session without modifying the packets while capturing the addressing and state information of the existing communications session.

3. The method of claim 1, wherein the transport protocol layer of the first node is a transport protocol stack having a plurality of individual transport protocol layers, including at least two of an IP layer, SCTP layer, M3UA layer, and SCCP layer.

4. The method of claim 3, wherein for SCTP, the captured information includes at least one of source and destination ports, verification tag, sequence number, stream identifier, stream sequence number, SACK information of the existing communications session, wherein for M3UA, the captured information includes at least one of source and destination point codes, network indicator, signaling link selection, and correlation identifier, and wherein for SCCP, the captured information includes at least one of source and destination local references.

5. The method of claim 2, wherein the transport protocol stack of the first node comprises a first transport protocol stack and a second transport protocol stack, wherein when the first and second transport protocol stacks are configured and activated, the first transport protocol stack is configured to communicate with the second node while the second transport protocol stack is configured to communicate with the third node independently via the existing communications session.

6. The method of claim 5, wherein in response to a message received from the second node via the existing communications session, the first transport protocol stack responds to the second node within the existing communications session without interacting with the third node, and wherein the first transport protocol stack is configured to initiate a message to the second node independent of the second transport protocol stack communicating with the third node.

7. The method of claim 5, wherein in response to a message received from the second node via the existing communications session, the first transport protocol stack passes the message to the second transport protocol stack to relay the message to the third node, and wherein the first transport protocol stack responds to the second node within the existing communications session without waiting for an acknowledgment from the third node in response to the relayed message.

8. A non-transitory machine-readable storage medium having instructions stored therein, which when executed by a machine, cause the machine to perform a method for introducing and configuring a network node of a packet network, the method comprising:

routing by a first node packets exchanged between a second node and a third node via an existing communications session, wherein the second node is a radio network controller (RNC), wherein the third node is a serving GPRS support node (SGSN) of a 3GPP network, and wherein the second node and the third node communicate with each other via the existing communications session prior to inserting the first node into the existing communications session between the second node and the third node, wherein the first node is a mobile data offload gateway (MDO GW) device located between the RNC and the SGSN, wherein the MDO GW device is configured to offload Internet traffic exchanged between the RNC and the Internet without going through the SGSN;

capturing by the first node addressing and state information of the existing communications session, while the first node routes the packets between the second node and the third node without modification of the packets; and configuring a transport protocol layer of the first node using addressing and state information pertaining to the existing communications session captured from the packets to enable the transport protocol layer of the first node to independently communicate with a transport protocol layer of the second node and the third node respectively without terminating or perturbing the existing communications session, such that the second node communicates with the first node as if it still communicates with the third node, and the third node communicates with the first node as if it still communicates with the second node.

9. The non-transitory machine-readable storage medium of claim 8, wherein the method further comprises configuring the first node initially as a passive router to route the packets between the second and third nodes via the existing communications session without modifying the packets while capturing the addressing and state information of the existing communications session.

10. The non-transitory machine-readable storage medium of claim 8, wherein the transport protocol layer of the first node is a transport protocol stack having a plurality of individual transport protocol layers, including at least two of an IP layer, SCTP layer, M3UA layer, and SCCP layer.

11. The non-transitory machine-readable storage medium of claim 10, wherein for SCTP, the captured information includes at least one of source and destination ports, verification tag, sequence number, stream identifier, stream sequence number, SACK information of the existing communications session, wherein for M3UA, the captured information includes at least one of source and destination point codes, network indicator, signaling link selection, and correlation identifier, and wherein for SCCP, the captured information includes at least one of source and destination local references.

12. The non-transitory machine-readable storage medium of claim 9, wherein the transport protocol stack of the first node comprises a first transport protocol stack and a second transport protocol stack, wherein when the first and second transport protocol stacks are configured and activated, the first transport protocol stack is configured to communicate with the second node while the second transport protocol stack is configured to communicate with the third node independently via the existing communications session.

13. The non-transitory machine-readable storage medium of claim 12, wherein in response to a message received from the second node via the existing communications session, the first transport protocol stack responds to the second node within the existing communications session without interacting with the third node, and wherein the first transport protocol stack is configured to initiate a message to the second node independent of the second transport protocol stack communicating with the third node.

14. The non-transitory machine-readable storage medium of claim 12, wherein in response to a message received from the second node via the existing communications session, the first transport protocol stack passes the message to the second transport protocol stack to relay the message to the third node, and wherein the first transport protocol stack responds to the second node within the existing communications session without waiting for an acknowledgment from the third node in response to the relayed message.

15. A network element, comprising:
a first network interface;
a second network interface;
a network stack having a transport protocol layer;
a system learning entity (SLE) coupled to the network stack to capture within the transport protocol layer addressing and state information pertaining to an existing communications session between a first node communicatively coupled to the first network interface and a second node communicatively coupled to the second network interface, while routing packets exchanged between the second and first nodes via the existing communications session, wherein the first node is a radio network controller (RNC), wherein the second node is a serving GPRS support node (SGSN) of a 3GPP network, and wherein the first node and the second node communicate with each other via the existing communications session prior to inserting the network element into the existing communications session between the first node and the second node, wherein the network element is a mobile data offload gateway (MDO GW) device located between the RNC and the SGSN, wherein the MDO GW device is configured to offload Internet traffic exchanged between the RNC and the Internet without going through the SGSN; and
a configuration unit coupled to the SLE to configure the transport protocol layer using the captured state information to enable the transport protocol layer to independently communicate with a transport protocol layer of the first node and the second node respectively without terminating the existing communications session, such that the first node communicates with the network element node as if it still communicates with the second node, and the second node communicates with the network element as if it still communicates with the first node.

16. The network element of claim 15, wherein the transport protocol layer comprises a transport protocol stack having a plurality of individual transport protocol layers, including at least two of an IP layer, SCTP layer, M3UA layer, and SCCP layer.

17. The network element of claim 16, wherein for SCTP, the captured information includes at least one of source and destination ports, verification tag, sequence number, stream identifier, stream sequence number, SACK information of the existing communications session, wherein for M3UA, the captured information includes at least one of source and destination point codes, network indicator, signaling link selection, and correlation identifier, and wherein for SCCP, the captured information includes at least one of source and destination local references.

* * * * *